(12) United States Patent
Otsuka et al.

(10) Patent No.: US 6,638,489 B2
(45) Date of Patent: Oct. 28, 2003

(54) CLEANING PROCESS AND CLEANING AGENT FOR HARMFUL GAS

(75) Inventors: Kenji Otsuka, Kanagawa (JP); Yukichi Takamatsu, Kanagawa (JP); Youji Nawa, Kanagawa (JP); Kazuaki Tonari, Kanagawa (JP)

(73) Assignee: Japan Pionics Co., Ltd., Tokyo (JP)

( * ) Notice: Subject to any disclaimer, the term of this patent is extended or adjusted under 35 U.S.C. 154(b) by 141 days.

(21) Appl. No.: 09/956,808

(22) Filed: Sep. 21, 2001

(65) Prior Publication Data

US 2002/0061272 A1 May 23, 2002

(30) Foreign Application Priority Data

Sep. 28, 2000 (JP) ........................................ 2000-296960

(51) Int. Cl.⁷ ................................................. A62D 3/00
(52) U.S. Cl. ..................... 423/245.1; 502/417; 588/205
(58) Field of Search ........................... 588/205; 502/181, 502/416, 417, 400; 423/245.1, 445 R, 449.4, 460

(56) References Cited

U.S. PATENT DOCUMENTS

| | | | | | |
|---|---|---|---|---|---|
| 3,662,523 A | * | 5/1972 | Revoir et al. | ................ | 502/417 |
| 4,174,373 A | * | 11/1979 | Yoshida et al. | ........... | 423/239.1 |
| 4,470,829 A | * | 9/1984 | Hirai et al. | .................... | 95/140 |
| 4,500,327 A | * | 2/1985 | Nishino et al. | ................ | 95/134 |
| 4,713,483 A | * | 12/1987 | Langerbeins et al. | ........ | 560/204 |
| 4,747,855 A | * | 5/1988 | Hirai et al. | .................... | 95/106 |
| 4,772,455 A | * | 9/1988 | Izumi et al. | ................. | 423/210 |
| 4,946,663 A | * | 8/1990 | Audley et al. | ........... | 423/447.1 |
| 5,132,259 A | * | 7/1992 | Curnutt | ........................ | 502/37 |
| 5,202,301 A | * | 4/1993 | McNamara | ................. | 502/417 |

* cited by examiner

*Primary Examiner*—Steven Bos
*Assistant Examiner*—Anthony Kuhar
(74) *Attorney, Agent, or Firm*—Oblon, Spivak, McClelland, Maier & Neustadt, P.C.

(57) ABSTRACT

There are disclosed a process for cleaning a harmful gas which comprises bringing the harmful gas containing as a harmful component, an organosilicon compound represented by the general formula: $CH_2CH—SiR_3$, $CH_2CH—Si(OR)_3$, $CH_2CHCH_2—SiR_3$ or $CH_2CHCH_2—Si(OR)_3$, wherein R indicates a saturated hydrocarbon group or an aromatic compound group, into contact with a cleaning agent comprising activated carbon adhesively incorporated with at least one species selected from the group consisting of bromine, iodine, a metal bromide and a metal iodide in which the metal is exemplified by copper, lithium, sodium, potassium, magnesium, calcium, strontium, manganese, iron, cobalt, nickel, zinc, aluminum and tin; and a cleaning agent comprising the same. The cleaning process and the cleaning agent enable to practically clean a harmful gas which is exhausted from a semiconductor manufacturing process and the like by the use of a dry cleaning process.

4 Claims, No Drawings

CLEANING PROCESS AND CLEANING AGENT FOR HARMFUL GAS

BACKGROUND OF THE INVENTION

1. Field of the Invention

The present invention relates to a process for cleaning a harmful gas containing as a harmful component, an organosilicon compound represented by the general formula: $CH_2CH—SiR_3$, $CH_2CH—Si(OR)_3$, $CH_2CHCH_2—SiR_3$ or $CH_2CHCH_2—Si(OR)_3$, wherein R is a saturated hydrocarbon group or an aromatic compound group; and a cleaning agent therefor. More particularly, it is concerned with a process for cleaning, by dry cleaning process, a harmful gas containing the above-mentioned organosilicon compound which gas is exhausted from a semiconductor manufacturing process or the like; and a cleaning agent therefor.

2. Description of the Related Arts

There has been developed in recent years, a wiring material of copper films which has low electric resistance and high electro-migration resistance as a new wiring material taking the place of the wiring material of aluminum films or aluminum alloy films. Plating, sputtering, CVD (chemical vapor deposition) and the like method have been put into practical application as a method of forming copper films. With continuous progress towards three dimensional trend of a device and multi-layer trend of a wiring material, the requirement for flatness of a thin film is steadily growing. Thus, there is expected the advancement of film forming technique by CVD method which technique is capable of forming a thin film meeting the requirements of favorable step coverage and a design rule of 0.13 $\mu$m or less.

In regard to copper film formation by means of CVD method, research and investigation have been made on a method in which any of various solid CVD feed materials is sublimed by being kept at an elevated temperature, and supplied in the form of vapor to a semiconductor manufacturing apparatus. However, disadvantages of the method such as an unreasonably small amount of vapor feed and a low rate of film formation led to unsuccess in commercialization thereof. Nevertheless, development has been made in recent years on CVD feed materials in the form of liquid such as hexafluoroacetylacetone-copper vinyltrimethylsilane $[(CF_3CO)_2CHCu.CH_2CHSi(CH_3)_3]$ or hexafluoroacetylacetone-copper allyltrimethylsilane $[(CF_3CO)_2 CHCu.CH_2CHCH_2Si(CH_3)_3]$, whereby the rate of film formation has been improved to such a level as commercializability. it being so, copper film formation was commenced by the use of the above-mentioned hexafluoroacetylacetone-copper complexes.

The CVD precursors are each used in a semiconductor manufacturing process, and thereafter exhausted to the outside of the process in the form of an organosilicon compound of a structure having a vinyl group such as vinyltrimethylsilane and allyltrimethylsilane. On account of its high toxicity, the organosilicon compound needs to be cleaned prior to the exhaust thereof into the atmosphere. However, nothing has hitherto been reported concerning an excellent means for cleaning a harmful gas containing an organosilicon compound. Such being the case, consideration is given, as a process for cleaning a harmful gas containing an organosilicon compound, to a wet cleaning process comprising absorbingly decomposing the gas in a scrubber; a dry cleaning process comprising bringing the gas into contact with activated carbon or a porous adsorbent of inorganic compound base; and a combustional cleaning process comprising burning harmful components by introducing the same into the flame of a fuel such as propane. Notwithstanding, the wet cleaning process and the combustional cleaning process each involve the problem as described hereunder.

Specifically, the wet cleaning process suffers from the disadvantages in that the cleaning unit is intricate and large sized and besides, any useful absorbing liquid has not yet been found owing to an organosilicon compound being insoluble in water. The combustional cleaning process suffers from the defect in that a combustional state is obliged to be maintained even at standby time when a harmful gas is not treated, whereby energy cost is markedly increased and besides, a large amount of carbon dioxide gas is exhausted into the atmosphere.

On the other hand, in the dry cleaning process, although having the advantages of simple cleaning unit and unnecessary fuel such as propane, there has not yet been developed any means imparted with excellent cleaning capacity (cleaning capacity for an organosilicon compound per unit amount of a cleaning agent).

SUMMARY OF THE INVENTION

In such circumstances, an object of the invention is to provide a cleaning means through a dry cleaning process imparted with excellent cleaning capacity for harmful gas containing an organosilicon compound such as vinyltrimethylsilane, said compound being represented by the general formula: $CH_2CH—SiR_3$, $CH_2CH—Si(OR)_3$, $CH_2CHCH_2—SiR_3$ or $CH_2CHCH_2—Si(OR)_3$, wherein R is a saturated hydrocarbon group or an aromatic compound group.

Another object of the invention is to provide a cleaning agent therefor.

Other objects of the invention will become obvious from the text of this specification hereinafter disclosed.

As a result of intensive research and development accumulated by the present inventors in order to solve the above-described problems involved in the prior arts, it has been found that a cleaning agent which comprises activated carbon adhesively incorporated with bromine, iodine, a metal bromide or a metal iodide exerts excellent cleaning capacity in dry system cleaning for harmful gas containing the foregoing organosilicon compound. The present invention has been accomplished by the foregoing findings and information.

That is to say, the present invention relates to a process for cleaning a harmful gas which comprises bringing the harmful gas containing as a harmful component, an organosilicon compound represented by the general formula: $CH_2CH-SiR_3$, $CH_2CH-Si(OR)_3$, $CH_2CHCH_2—SiR_3$ or $CH_2CHCH_2—Si(OR)_3$, wherein R is a saturated hydrocarbon group or an aromatic compound group, into contact with a cleaning agent comprising activated carbon adhesively incorporated with at least one species selected from the group consisting of bromine, iodine, a metal bromide and a metal iodide.

In addition, the present invention is concerned with a cleaning agent which comprises activated carbon adhesively incorporated with at least one species selected from the group consisting of bromine, iodine, a metal bromide and a metal iodide, and which is intended for cleaning a harmful gas containing as a harmful component, an organosilicon compound represented by the general formula: $CH_2CH—SiR_3$, $CH_2CH—Si(OR)_3$, $CH_2CHCH_2—SiR_3$ or $CH_2CHCH_2—Si(OR)_3$, wherein R is a saturated hydrocarbon group or an aromatic compound group.

DESCRIPTION OF THE PREFERRED EMBODIMENTS

The cleaning agent and cleaning process according to the present invention are each applied to the cleaning of a harmful gas which is contained in such a gas as nitrogen, argon, helium and hydrogen, and which contains, as a harmful component, an organosilicon compound represented by the general formula: $CH_2CH—SiR_3$, $CH_2CH—Si(OR)_3$, $CH_2CHCH_2—SiR_3$ or $CH_2CHCH_2—Si(OR)_3$, wherein R is a saturated hydrocarbon group or an aromatic compound group. The cleaning agent according to the present invention which comprises activated carbon adhesively incorporated with at least one species selected from the group consisting of bromine, iodine, a metal bromide and a metal iodide. The cleaning process according to the present invention comprises bringing the above-mentioned harmful gas into contact with the cleaning agent as mentioned above.

With regard to the gas which is an object of cleaning in the present invention, examples of the organosilicon compound represented by the general formula: $CH_2CH—SiR_3$ include $CH_2CH—Si(CH_3)_3$, $CH_2CH—Si(C_2H_5)_3$ and $CH_2CH—Si(C_6H_5)_3$; and examples of the organosilicon compound represented by the general formula: $CH_2CH-Si(OR)_3$ include $CH_2CH—Si(OCH_3)_3$, $CH_2CH—Si(OC_2H_5)_3$, $CH_2CH—Si(OC_6H_5)_3$ and $CH_2CH—Si(OC_6H_5Cl)_3$.

Examples of the organosilicon compound represented by the general formula: $CH_2CHCH_2—SiR_3$ include $CH_2CHCH_2—Si(CH_3)_3$, $CH_2CHCH_2—Si(C_2H_5)_3$ and $CH_2CHCH_2—Si(C_6H_5)_3$; and examples of the organosilicon compound represented by the general formula: $CH_2CHCH_2—Si(OR)_3$ include $CH_2CHCH_2—Si(OCH_3)_3$, $CH_2CHCH_2—Si(OC_2H_5)_3$, $CH_2CHCH_2—Si(OC_6H_5)_3$ and $CH_2CHCH_2—Si(OC_6H_4Cl)_3$. Therein, R in one molecule may be a saturated hydrocarbon group or an aromatic compound group each being same as or different from one another.

The activated carbon which is employed in the cleaning agent according to the present invention is not specifically limited provided that it has high adsorptivity and a particle size usable as a cleaning agent. Usually, the activated carbon has a specific surface area in the range of 700 to 2500 $m^2/g$ and a particle size of approximately 4 to 32 mesh as aperture in a sieve. Examples of usable activated carbon include coal based-activated carbon, charcoal-based activated carbon and coconut shell-based activated carbon, which is particularly suitable among them.

Examples of the metal bromide which is employed in the cleaning agent according to the present invention include lithium bromide, sodium bromide, potassium bromide, magnesium bromide, calcium bromide, strontium bromide, manganese bromide, iron bromide, cobalt bromide, nickel bromide, copper bromide, zinc bromide, aluminum bromide and tin bromide. Examples of the metal iodide which is employed in the cleaning agent include lithium iodide, sodium iodide, potassium iodide, magnesium iodide, calcium iodide, strontium iodide, manganese iodide, iron iodide, cobalt iodide, nickel iodide, copper iodide, zinc iodide and tin iodide.

In the present invention, there is usually used any of the above-cited bromine, iodine, metal bromides and metal iodides alone in the form of adhesively incorporated in the activated carbon, but it is possible to use any of them in combination with at least one other in the form as mentioned above. In any of the aforesaid two cases, the amount of the species that is to be adhesively incorporated in the activated carbon is usually 0.1 to 20%, preferably 0.2 to 10% each by weight based on the amount of the activated carbon. The amount thereof, when being less than 0.1% by weight based thereon, leads to incapability of assuring excellent cleaning performance, whereas the amount, when being more than 20% by weight based thereon, leads to success in assuring excellent cleaning performance, but it is difficult to manufacture the cleaning agent having such a high content of the species.

There is not any limitation on the method for adhesively incorporating in the activated carbon, any of the above-cited bromine, iodine, metal bromides and metal iodides, provided that the method is capable of adhesively incorporating any of the species therein uniformly. There are available, for instance, a method comprising the steps of dissolving any of the species in water or an organic solvent, impregnating the resultant solution into the activated carbon, and thereafter drying the same; a method comprising the steps of sprinkling a solution of any of the species in water or an organic solvent on the activated carbon, while being stirred, and thereafter drying the same; and the like method. The cleaning agent exhibits excellent cleaning performance under dry condition, but may contain moisture in an amount of at most 5% by weight based on the total amount of the cleaning agent.

The cleaning agent according to the present invention is usually packed in a cleaning column for cleaning a harmful gas so that it is used in a fixed bed, but it is possible to use the same in a moving bed. The packing density of the cleaning agent when it is packed in a cleaning column, though varies depending upon the shape of the agent and the preparation method thereof, is in the range of approximately 0.4 to 2.0 g/ml. The cleaning treatment is put into practice usually by passing a harmful gas containing the aforesaid organosilicon compound as the harmful component through the cleaning column packed inside with the cleaning agent to bring the harmful gas into contact therewith.

Since heating or cooling for the sake of cleaning is not required in particular in the cleaning process according to the present invention, the temperature at which the harmful gas which is the object of treatment is brought into contact with the cleaning agent is usually 100° C. or lower, preferably a temperature at around room temperature, that is, 10 to 50° C. Soon after the start of cleaning, there is observed temperature rise of approximately 10 to 40° C. as the case may be, but there is no fear of causing abnormal exothermic state.

The pressure at which the cleaning is carried out is not specifically limited, but is usually atmospheric pressure. It is also possible to operate the cleaning system at reduced pressure or under pressure such as 0.1 $MPa/cm^2G$.

The harmful gas to which the cleaning process of the present invention is applied may be in either a dry or moist condition, provided that it is within an extent free from dew condensation.

There are no specific limitations on the concentration and flow rate of the organosilicon compound that is contained in the harmful gas to which the cleaning process of the present invention is applied. In general, however, the flow rate is set on a lower level with an increase in the concentration. The concentration of the organosilicon compound is usually 1% or lower, but it is also possible to treat organosilicon compounds having a concentration higher than 1%. Usually, the gas to be treated in the process according to the present invention comprises nitrogen, argon, helium, hydrogen or the like as a base gas and organosilicon compounds. In the case where hydrogen is contained in the base gas, the concentration of hydrogen in the gas to be treated is set on usually 50% or lower, preferably 20% or lower. A concentration of hydrogen therein, when being higher than 50%, brings about a fear of generating hydrogen bromide or hydrogen iodide upon contact with the cleaning agent.

The cleaning column is designed according to the flow rate of the gas to be treated, the concentration of the organosilicon compounds as harmful components and the like factors. In general, the superficial linear velocity (LV) of the gas to be treated is set on the range of 0.5 to 50 cm/sec for a relatively low concentration of the organosilicon compounds being 0.1% or lower; on the range of 0.05 to 20 cm/sec for a concentration thereof being 0.1 to 1%; and on the range of at most 10 cm/sec for a relatively high concentration thereof being 1% or higher.

In summarizing the working effects and advantages of the process for cleaning a harmful gas and a cleaning agent therefor it has been made possible to practically clean by the use of a dry cleaning process, a harmful gas containing as a harmful component, an organosilicon compound represented by the general formula: $CH_2CH-SiR_3$, $CH_2CH-Si(OR)_3$, $CH_2CHCH_2-SiR_3$ or $CH_2CHCH_2-Si(OR)_3$, wherein R is a saturated hydrocarbon group or an aromatic compound group.

In what follows, the present invention will be described in more detail with reference to comparative examples and working examples, which however shall never limit the present invention thereto.

EXAMPLE 1

Preparation of Cleaning Agent

A solution of 10 g of copper bromide in 1000 ml of water was uniformly impregnated into 1000 g of activated carbon (manufactured by Takeda Chemical Industries, Ltd. under the trade name "Sirasagi G2C"), and thereafter the impregnated activated carbon was dried at 50° C. for 16 hours to prepare a cleaning agent which had a ratio by weight of the copper bromide to the activated carbon of 1.0% and a moisture of 1.2% by weight.

Cleaning Test

The cleaning agent thus obtained was packed in a quartz glass made cleaning column having an inside diameter of 20 mm up to a volume of 31.4 ml. Subsequently, a gas which contained 4200 ppm of vinyltrimethylsilane as the harmful component, and which was contained in dry nitrogen was passed through the cleaning column at 20° C. under atmospheric pressure at a flow rate of 470 ml/min (a superficial linear velocity of 2.5 cm/sec). During the operation, the gas at the outlet of the cleaning column was sampled, and a measurement was made of a period of time required to detect the vinyltrimethylsilane (effective treatment time) by the use of an infrared absorption spectrum measuring instrument (lower detectable limit of 1 ppm). From the result of the above measurement, there was determined the volume of thus removed vinyltrimethylsilane gas (liter) per one liter of the cleaning agent (cleaning capacity). The results are given in Table 1.

EXAMPLES 2 to 4

The procedure in Example 1 was repeated to prepare three types of cleaning agents except that use was made of the copper bromide in amounts of 2.5 g, 5.0 g and 50 g in place of 10 g. The moisture in each of the cleaning agents was in the range of 0.5 to 1.5% by weight. Subsequently, cleaning tests were carried out in the same manner as in Example 1 except that the above prepared cleaning agents were used in place of that in Example 1. The results are given in Table 1.

EXAMPLES 5 to 7

The cleaning tests were carried out in the same manner as in Example 1 except that there were used as a harmful component, vinyltrimethylsilane having concentrations of 200 ppm, 1000 ppm and 9000 ppm, respectively in place of 4200 ppm. The results are given in Table 1.

EXAMPLES 8 to 33

The procedure in Example 1 was repeated to prepare 26 types of cleaning agents except that use was made of lithium bromide, sodium bromide, potassium bromide, magnesium bromide, calcium bromide, strontium bromide, manganese bromide, iron bromide, cobalt bromide, nickel bromide, zinc bromide, aluminum bromide and tin bromide, lithium iodide, sodium iodide, potassium iodide, magnesium iodide, calcium iodide, strontium iodide, manganese iodide, iron iodide, cobalt iodide, nickel iodide, copper iodide, zinc iodide and tin iodide in place of the copper bromide. The moisture in each of the cleaning agents was in the range of 0.5 to 1.5% by weight. Subsequently, cleaning tests were carried out in the same manner as in Example 1 except that each of the above-prepared cleaning agents was used in place of that in Example 1. The results are given in Table 1.

EXAMPLES 34 and 35

The procedure in Example 1 was repeated to prepare 2 types of cleaning agents except that use was made of bromine and iodine in place of the copper bromide, and that use was made of ethanol as a solvent in place of the water. The moisture in each of the cleaning agents was in the range of 0.5 to 1.5% by weight. Subsequently, cleaning tests were carried out in the same manner as in Example 1 except that each of the above-prepared cleaning agents was used in place of that in Example 1. The results are given in Table 1.

EXAMPLES 36 to 39

The cleaning tests were carried out in the same manner as in Example 1 except that there were used as harmful components, vinyltrimethoxysilane, allyltrimethylsilane, allyltrimethoxysilane and allyltriphenyl-silane, respectively in place of vinyltrimethylsilane. The results are given in Table 1.

Comparative Example 1

The cleaning tests were carried out in the same manner as in Example 1 except that there was used as the cleaning agent, activated carbon (manufactured by Takeda Chemical Industries, Ltd. under the trade name "Sirasagi G2C") that was not adhesively incorporated with any of bromine, iodine, a metal bromide and a metal iodide. The results are given in Table 1.

Comparative Examples 2 to 5

The cleaning tests were carried out in the same manner as in Example 1 except that there was used as the cleaning agent, activated carbon (manufactured by Takeda Chemical Industries, Ltd. under the trade name "Sirasagi G2C") that was not adhesively incorporated with any of bromine, iodine, a metal bromide and a metal iodide, and that there were used as a harmful component, vinyltrimethoxysilane, allyltrimethylsilane, allyltrimethoxysilane and allyltriphenyl-silane, respectively in place of vinyltrimethylsilane. The results are given in Table 1.

TABLE 1

|  | Harmful gas component | Conc. (ppm) | Adhesively Incorporated compound in activated carbon | Solvent | Adhesive incorporation rate (%) | Cleaning capacity (L/L agent) |
|---|---|---|---|---|---|---|
| Example 1 | VTMeS | 4200 | Cu bromide | water | 1.0 | 34.7 |
| Example 2 | VTMeS | 4200 | Cu bromide | water | 0.25 | 36.5 |
| Example 3 | VTMeS | 4200 | Cu bromide | water | 0.5 | 34.8 |
| Example 4 | VTMeS | 4200 | Cu bromide | water | 5.0 | 33.6 |
| Example 5 | VTMeS | 200 | Cu bromide | water | 1.0 | 16.0 |
| Example 6 | VTMeS | 1000 | Cu bromide | water | 1.0 | 26.1 |
| Example 7 | VTMeS | 9000 | Cu bromide | water | 1.0 | 45.0 |
| Example 8 | VTMeS | 4200 | Li bromide | water | 1.0 | 28.9 |
| Example 9 | VTMeS | 4200 | Na bromide | water | 1.0 | 26.7 |
| Example 10 | VTMeS | 4200 | K bromide | water | 1.0 | 29.4 |
| Example 11 | VTMeS | 4200 | Mg bromide | water | 1.0 | 28.1 |
| Example 12 | VTMeS | 4200 | Ca bromide | water | 1.0 | 20.1 |
| Example 13 | VTMeS | 4200 | Sr bromide | water | 1.0 | 19.1 |
| Example 14 | VTMeS | 4200 | Mn bromide | water | 1.0 | 30.8 |
| Example 15 | VTMeS | 4200 | Fe bromide | water | 1.0 | 35.2 |
| Example 16 | VTMeS | 4200 | Co bromide | water | 1.0 | 35.6 |
| Example 17 | VTMeS | 4200 | Ni bromide | water | 1.0 | 30.1 |
| Example 18 | VTMeS | 4200 | Zn bromide | water | 1.0 | 25.1 |
| Example 19 | VTMeS | 4200 | Al bromide | water | 1.0 | 18.7 |
| Example 20 | VTMeS | 4200 | Sn bromide | water | 1.0 | 24.1 |
| Example 21 | VTMeS | 4200 | Li iodide | water | 1.0 | 25.6 |
| Example 22 | VTMeS | 4200 | Na iodide | water | 1.0 | 26.3 |
| Example 23 | VTMeS | 4200 | K iodide | water | 1.0 | 30.5 |
| Example 24 | VTMeS | 4200 | Mg iodide | water | 1.0 | 19.2 |
| Example 25 | VTMeS | 4200 | Ca iodide | water | 1.0 | 18.3 |
| Example 26 | VTMeS | 4200 | Sr iodide | water | 1.0 | 17.6 |
| Example 27 | VTMeS | 4200 | Mn iodide | water | 1.0 | 28.8 |
| Example 28 | VTMeS | 4200 | Fe iodide | water | 1.0 | 30.8 |
| Example 29 | VTMeS | 4200 | Co iodmide | water | 1.0 | 31.7 |
| Example 30 | VTMeS | 4200 | Ni iodide | water | 1.0 | 27.8 |
| Example 31 | VTMeS | 4200 | Cu iodide | water | 1.0 | 28.5 |
| Example 32 | VTMeS | 4200 | Zn iodide | water | 1.0 | 23.2 |
| Example 33 | VTMeS | 4200 | Sn iodide | water | 1.0 | 21.0 |
| Example 34 | VTMeS | 4200 | bromine | ethanol | 1.0 | 29.9 |
| Example 35 | VTMeS | 4200 | iodine | ethanol | 1.0 | 40.7 |
| Example 36 | VTMeoxS | 4200 | Cu bromide | water | 1.0 | 36.8 |
| Example 37 | AyTMeS | 4200 | Cu bromide | water | 1.0 | 36.5 |
| Example 38 | AyTMeoxS | 4200 | Cu bromide | water | 1.0 | 37.7 |
| Example 39 | AyTPhyS | 4200 | Cu bromide | water | 1.0 | 38.1 |
| C/Example 1 | VTMeS | 4200 | — | — | — | 4.4 |
| C/Example 2 | VTMeoxS | 4200 | — | — | — | 3.8 |
| C/Example 3 | AyTMeS | 4200 | — | — | — | 3.9 |
| C/Example 4 | AyTMeoxS | 4200 | — | — | — | 3.8 |
| C/Example 5 | AyTPhyS | 4200 | — | — | — | 4.5 |

[Remarks]
VTMeS: vinyltrimethylsilane,
VTMeoxS: vinyltrimethoxysilane,
AyTMeS: allyltrimethylsilane,
AyTMeoxS: allyltrimethoxysilane,
AyTPhyS: allyltriphenylsilane,
Cu: copper,
Li: lithium,
Na: sodium,
K: potassium,
Mg: magnesium,
Ca: calcium,
Sr: strontium,
Mn: manganese,
Fe: iron,
Co: cobalt,
Ni: nickel,
Zn: zinc,
Al: aluminum,
Sn: tin
C/Example: Comparative Example

What is claimed is:

1. A process for cleaning a harmful gas which comprises bringing the harmful gas containing as a harmful component, an organosilicon compound represented by the general formula: $CH_2CH-SiR_3$, $CH_2CH-Si(OR)_3$, $CH_2CHCH_2-SiR_3$ or $CH_2CHCH_2-Si(OR)3$, wherein R is a saturated hydrocarbon group or an aromatic compound group, into contact with a cleaning agent comprising activated carbon adhesively incorporated with at least one species selected from the group consisting of bromine, iodine, a metal bromide and a metal iodide.

2. The process for cleaning a harmful gas according to claim 1, wherein the organosilicon compound is at least one species selected from the group consisting of vinyltrimethylsilane, vinyltrimethoxysilane, allyltrimethylsilane, allyltrimethoxysilane and allyltriphenylsilane.

3. The process for cleaning a harmful gas according to claim 1, wherein the metal bromide is at least one species selected from the group consisting of lithium bromide, sodium bromide, potassium bromide, magnesium bromide, calcium bromide, strontium bromide, manganese bromide, iron bromide, cobalt bromide, nickel bromide, copper bromide, zinc bromide, aluminum bromide and tin bromide.

4. The process for cleaning a harmful gas according to claim 1, wherein the metal iodide is at least one species selected from the group consisting of lithium iodide, sodium iodide, potassium iodide, magnesium iodide, calcium iodide, strontium iodide, manganese iodide, iron iodide, cobalt iodide, nickel iodide, copper iodide, zinc iodide and tin iodide.

* * * * *